United States Patent [19]

Hull

[11] 4,043,521
[45] Aug. 23, 1977

[54] CASTING REEL FOR FISHING

[76] Inventor: R. Dell Hull, Zebco, 6101 E. Apache St., Tulsa, Okla. 74101

[21] Appl. No.: 593,461

[22] Filed: July 7, 1975

[51] Int. Cl.² ............................................. A01K 89/04
[52] U.S. Cl. ................................................. 242/84.41
[58] Field of Search ................. 242/84.41, 84.42, 84.4, 242/158.1, 158 R

[56] References Cited

U.S. PATENT DOCUMENTS

| | | | |
|---|---|---|---|
| 834,420 | 10/1906 | Taylor | 242/43 A |
| 969,598 | 9/1910 | Buttles | 242/158.1 |
| 1,282,990 | 10/1918 | Upton et al. | 242/84.42 |
| 1,328,066 | 1/1920 | Vasselli | 242/84.41 |
| 2,321,650 | 6/1943 | Burdick | 242/84.41 |

Primary Examiner—Richard E. Aegerter
Assistant Examiner—John W. Shepperd
Attorney, Agent, or Firm—Mandeville and Schweitzer

[57] ABSTRACT

Disclosed herein is an improved casting reel for fishing in which a unique, non-line trapping level winding mechanism is incorporated into the reel structure, along with a unique clutching arrangement for releasing a line spool for free wheeling rotation independently of the drive mechanism for the spool and the level winding mechanism. The new reel structure also may include a star drag brake, clicker, and other conventional fishing reel mechanisms typically associated with reels of this general type.

7 Claims, 6 Drawing Figures

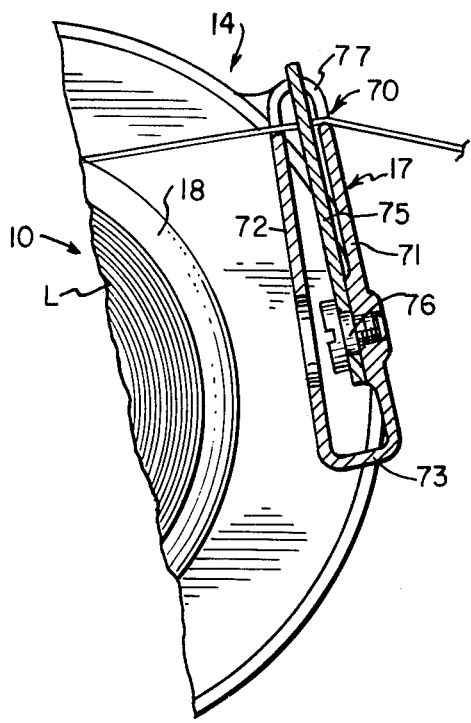
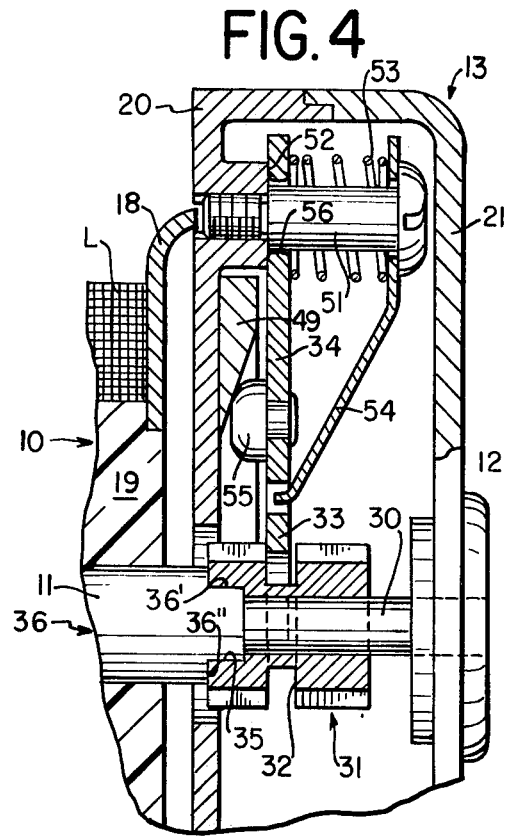
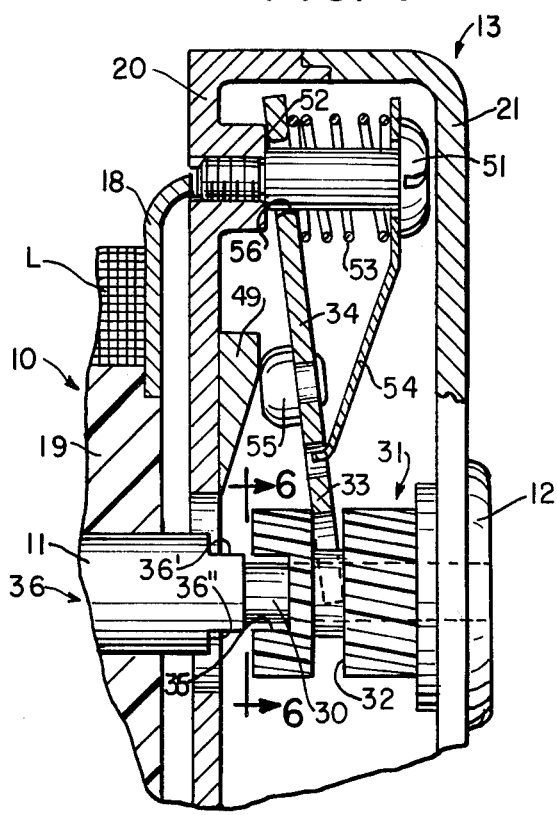

CASTING REEL FOR FISHING

BACKGROUND AND SUMMARY OF THE PRESENT INVENTION

The casting fishing reel art is extremely crowded and very well developed, and the teachings thereof are directed to many of the specific aspects and mechanisms of a smoothly and efficiently functioning casting reel. Many conventional casting reels have "free wheeling" line spools which are bearing supported for optimum performance during casting, and which reels are clutched and declutched between free wheeling casting condition and mechanically driven and controlled line retrieval condition by suitable control arrangements.

Many of the prior art reels have various line distributing or "level winding" arrangements which are adapted to distribute the retrieved line in uniform abutting courses across the spool hub during rewinding or line retrieval operations. For example, U.S. Pat. Nos. 2,600,774; 1,369,785; 2,493,428; 368,992; and 2,321,650 all show level wind line distributors which pivot in a plane transverse to the retrieved fishing line. Each of these patents discloses a lever which is pivoted by an eccentric mechanism driven by a gear. In some cases, the gear is a worm wheel, in other cases, it is a conventional gear. The levers shown assume a variety of shapes, including one having a closed, elongated loop; an open fork cooperating with a closed channel to define a line entrapping lever; or a similar open fork arrangement cooperating by superimposition with an elongated channel to define a line entrapping opening; or a pair of U-shaped lever-like elements.

In accordance with the teachings of the present invention, an improved cross winding or level winding arrangement is provided in which a hollow, shallow U-shaped line guide is arranged transversely of the path of the fishing line to guide the line as it passes thereover. Disposed within the hollow line guide is a pivoting lever, which is effectively inactivated or disengaged from the line at each end of its stroke by disappearance or complete retraction within the side walls of the hollow guide. This unique arrangement provides for a simple and reliable "non-trapping" line distributor, i.e., one which does not encircle or otherwise enclose the line or interfere with the line during casting. The pivoting line distributor element is driven during line retrieval by an eccentric mechanism associated with the crank-driven winding mechanism, and the line distributor is inactivated during casting.

Clutch mechanisms for clutching and declutching a winding gear from a winding pinion in casting reels having level winding mechanisms are also generally known to the art. For example, prior art reels have, in the past, effected such clutching and declutching by a wide variety of mechanisms, including those shown in U.S. Pat. No. 3,051,409, in which a crank handle-actuated mechanism automatically reengages the clutch of a reel which also includes a level wind. Similarly, U.S. Pat. Nos. 2,076,097 and 2,129,386 show cammable pinions which are clutched into and out of engagement with a drive train under the control of an operating lever; U.S. Pat. Nos. 2,536,583 and 2,980,361 show the types of pinions which are generally utilized in conventional casting reels; while U.S. Pat. Nos. 3,425,644 and 3,171,609 show further variations of clutching and control arrangements for free wheeling, bearing supported line spools.

As will become apparent hereinafter, a simple and reliable clutching and declutching mechanism, representing a further aspect of the present invention, provides an improvement over prior art proposals and an important contribution to this very crowded fishing reel art. The new mechanism lends itself to mass production of casting reels of the general type disclosed herein at reasonable costs; lends itself to incorporation in new reels having associated therewith the new and improved level winding mechanism; and provides for a compact, desirable, reliable, easy to maintain and operate casting reel.

For a better understanding of the construction of the new casting reel and a better appreciation of the new and improved level wind and clutch arrangements incorporated therein and their attendant advantages, reference should be made to the following detailed description of the new reel taken in conjunction with the accompanying drawings.

DESCRIPTION OF THE DRAWINGS

FIG. 3 is an enlarged, fragmentary, cross-sectional view of the new reel, taken along line 3—3 of FIG. 2, showing the configuration of the new hollow line guide for the line distribution of the level winding mechanism;

FIG. 4 is an enlarged, fragmentary, cross-sectional view of the reel, taken along line 4—4 of FIG. 1, showing details of construction of the clutching arrangement therefor in a "clutch engaged" or "clutched" condition;

FIG. 5 is an enlarged, fragmentary, cross-sectional view similar to that of FIG. 4 showing the clutching mechanism in a "clutch disengaged" or "declutched" condition; and FIG. 6 is an end elevational view of the clutch pinion employed in the construction of the new reel, which view is taken along line 6—6 of FIG. 5.

DETAILED DESCRIPTION OF THE PRESENT INVENTION

Figures 1, 2:
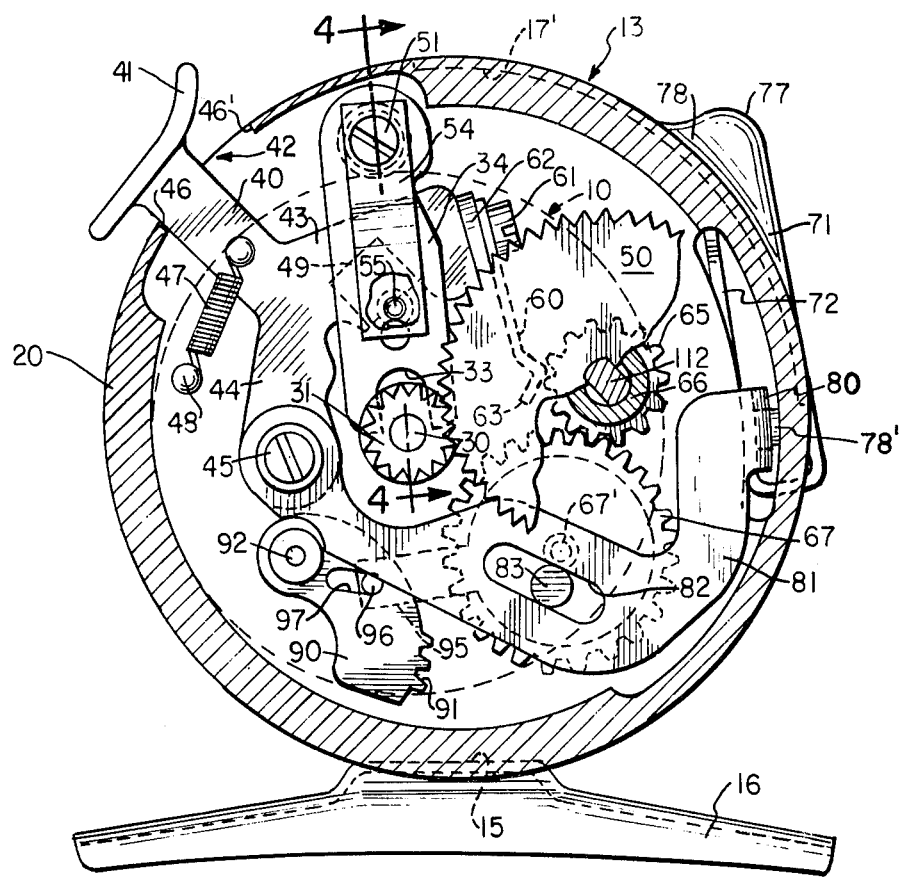
FIG. 1 is a cross-sectional view of the casting reel construction of the new invention showing the driving mechanism therefor.
FIG. 2 is a "front" elevational view of the new reel with parts broken away to show details of construction of the line distributor of the new level winding mechanism; For convenience of description, terms such as front, rear, upper, lower, and like locational or directional expressions refer to the reel as shown in FIG. 2.

Referring now to FIGS. 1, 2 & 5, the new casting reel includes a line spool 10 comprising end flanges 18 and hub 19 mounted directly on a spool shaft 11 for free wheeling rotation when the shaft is declutched from the reel drive mechanism and for driven rotation when the shaft 11 is clutched to the reel drive mechanism. As is conventional in reels of this type, the opposite ends of the shaft 11 are journaled in bearings 12 supported in spaced, circular end housings 13 and 14, which end housings are maintained in parallel, coaxial relation by a transverse lower pillar plate 15 mounting a tang 16 and by an upper pillar plate 17' mounting a new and improved line guide member 17.

As is conventional in casting reels of this type, the end housings 13, 14 also contain spool winding structures and other associated control mechanisms. Advantageously, the inner walls of the end housings 13, 14 are flat and parallel to one another and include circular grooves in which the rims of the spool flanges 18 are disposed. The end housing 14 may include a clicker alarm mechanism (not shown) of conventional construction.

Specifically and as shown in FIG. 4, the housing 13 comprises an inner, generally circular plate member 20, having a flat face, to which is secured an outer cup-shaped cover 21 in a "clam shell" arrangement. The other housing 14 is comprised of an inner circular plate member 23, having a flat face, to which an outer, cup-shaped cover 22 is appropriately secured in telescoping fashion.

The driving or winding mechanism for effecting positive rotation of the spool 10 for line retrieval is housed within the housing 13 and includes a new and improved clutch mechanism for selectively releasing the driving mechanism from direct engagement with the spool shaft 11, to allow the shaft to spin freely during line casting and for reengaging the driving mechanism for the winding of the spool for line retrieval.

Referring now to FIG. 5, the spool shaft 11 has a reduced diameter outer end 30 which is supported in the bearing 12 in the cover 21, which end 30 mounts for limited axial displacement therealong, a helical clutch pinion 31. An annular recess 32 is formed in the pinion, and it accommodates the disposal of a yoke-like free end 33 of a clutch lever 34 therein. The inner face of the pinion 31 is provided with a rectangular female slot or clutch jaw 35 which is adapted to mate with a correspondingly shaped clutch element 36, formed by parallel flats 36' and shoulder 37 which are machined on the spool shaft 11 between the reduced diameter portion 30 and the major diameter portions of the shaft 11. As will be appreciated, when the clutch elements 35, 36 are engaged, the shaft 11 may be directly driven by the rotation of the clutch pinion 31. However, when the clutch pinion 31 is moved out of engagement with the clutch element 36 formed on the shaft 11, the driving connection between the shaft 11 and the pinion 31 is totally disrupted, and the shaft is free to rotate independently of the clutch pinion and, therefore, freely of the drive or winding mechanism of the reel by which the pinion 31 is driven.

More specifically, winding torque will be transmitted to the shaft 11 when jaw 35 of the clutch pinion 31 is engaged with the shaft clutch element 36, and the pinion 31 is rotated by meshing engagement with a large winding gear 50 directly driven by the manual crank 110. As shown in FIG. 2, the crank 110 is fastened by a nut 111 to the free end of a crankshaft 112 which is journaled for rotation within a hub 113 formed integrally with the housing 13. The crank 110 is operable by a fisherman through a handle 114 rotatably secured to one or both ends thereof in known fashion. The rotation of the crankshaft 112 is transmitted to the winding gear 50, which is directly mounted on the shaft 112 for rotation therewith.

In accordance with the principles of the invention, when it is desired to cast line L from the spool 10, the winding mechanism is declutched from the spool shaft 11, by pivoting movement of the clutch lever 34 to axially displace the pinion 31 (FIG. 5). Precise control of the clutch lever 34 is obtained through a unique actuating mechanism, including a bifurcated control lever 40 (FIG. 1), the free end of which forms an integral thumb button 41 which projects outwardly beyond the periphery of the housing 13 through a circumferential slot 42 formed in the plate member 20. The control lever 40 includes an upper arm 43 and a lower arm 44 having a pivot hole through which the lever 40 is pivotably mounted to the plate member 20 by a screw 45 definitive of the pivot axis. A coil spring 47 biases the lever 40 towards a first clutch engaged position, in which the upper portion of the lever 40 rests against the edge 46 of the slot 42, and in which position the button 41 is raised (with respect to the housing periphery).

As shown in FIG. 1, the spring 47 is attached to the control lever 40 and a post 48 mounted in the housing 13. The control lever 40 may be pivoted about the pivot axis upwardly and inwardly of the plate member 20 to a second clutch disengaged position in which the upper portion of the lever rests against the edge 46' of the slot and in which position the button 41 is depressed (with respect to the housing periphery). When the lever 40 is pivoted toward the second or declutched position, a cam portion 49 formed on the arm 43 is moved downwardly towards the shaft 11 (FIG. 5) from its elevated first position (FIG. 4). The cam portion 49 cooperates with a cam follower 55 carried by the clutch lever 34 to cam the clutch lever from a first clutching position (FIG. 4), in which the jaw 35 of the pinion 31 is directly engaged with the clutch element 36 on shaft 11, to a second declutching position (FIG. 5) in which the pinion 31 is disengaged from the clutch element 36. As will be understood, in this position the shaft 11 is free to rotate independently of the winding mechanism, and the spool 10 is adapted to be freely rotatable or "free wheeling" for casting.

The clutch lever 34 is mounted through hole 56 by a screw 51 which is threaded to an integral boss or spacing element 52 formed in the plate member 20. The clutch control lever 34 is displaceable axially of the screw 51 and is biased towards the spacer 52 by a coil spring 53 and a leaf spring 54 which are mounted between the head of the screw 51 and the clutch control lever 34, as shown in FIGS. 4 and 5. The leaf spring 54, as will be appreciated, tends to rapidly return the clutch lever 34 into a clutch "engaged" position when the cam follower 55 is not outwardly displaced by the cam 49. Thus, it will be understood that, when the control lever 40 is pivoted by "depressing" the thumb button 41, the cam 49 will thrust the follower 55 and the clutch control lever 34 axially towards the cover 21, thereby declutching the pinion 31 from the shaft 11 to accommodate free wheeling of the spool 10 during a casting operation.

As a further specific aspect of the invention, the control lever 40 is locked in the second position by a detent spring 60 carried by the free end portion 62 of the arm 43, which portion 62 is inwardly bent and extends generally parallel to the axis of the spool. Specifically, the detent spring 60 is fastened by a screw 61 to the bent portion 62, as shown in FIG. 1. A locking detent 63, formed at the free end of the detent spring element 60, is shaped to be held by the teeth 65 of a level wind pinion 66 mounted directly on the crankshaft 112 and adapted to mesh with a gear 67 for drive of the level winding mechanism, as will be described in greater detail hereinafter. In accordance with the invention, when it is desired to retrieve the line or to remove the casting reel from its free wheeling mode, it is only necessary to slightly rotate the crankshaft 112 in the line retrieval direction (clockwise, as viewed in FIG. 1). This will cause the pinion teeth 65 to pivot the detent spring 60 and the lever 40 upwardly toward the first position in which the control lever 40 is in the clutched, direct drive mode. The rapid return of the control lever 40 to the first position will be assisted by the action of the return spring 47, as well as by the spring biasing of follower 55 acting against cam 49, as will be understood. Of course, the rotation of the crankshaft 112 will additionally cause the direct engagement of the pinion 31 with the shaft 11 by the urging of the clutch lever 34 into its clutching position (FIG. 4) by the springs 54, 53.

As an important feature of the present invention, a new and improved level winding mechanism is incorporated in the new reel. As shown best in FIGS. 1, 2 and 3, the level winding mechanism includes a hollow line guide 17, mounted on the pillar plate 17', and having a generally shallow U-shaped opening 70 extending across the width of the spool 10. The line guide 17 includes an outer wall 71 and an inner wall 72 which are spaced apart, as shown in FIG. 3, and connected by a transverse bottom wall 73, and narrow top walls 77. The line guide 17 is fixed to the pillar plate 17' by welds 78 or is otherwise suitably supported between the end housings 13, 14. A new and improved "non-trapping" line distribution lever 75 is mounted for pivoting movement within the hollow line guide by a screw 76 having an annular pivot 76' about which the lever 75 pivots back and forth. As indicated in FIG. 2, the travel of the upper, tapered or needle-like free end 79 of the line distribution lever 75 carries it across the opening 70 in the line guide walls 71, 72; however, at each end of its travel, the free end 79 of the lever "disappears" within the line guide and beneath upper line guide walls 77, as indicated in FIG. 2.

The line distributor 75 has a foot portion 78 which carries a driving pin 78' thereon, which driving pin is reciprocated in the directions of the arrows A, shown in FIG. 2, to pivot the lever in the directions of the arrows B, in FIG. 2. Specifically, the pin 78' is driven by the forked, free end 80 of a level wind drive lever 81, which is mounted on the plate 20 for pivotal movement by the screw 45, as indicated in FIG. 1. The level wind drive lever 81 has an elliptical opening 82 formed therein, which is driven by an eccentric drive pin 83 carried by the level wind drive gear 67.

Thus, rotation of the manual crankshaft 112 will rotate pinion 66 which, in turn, will drive the level wind gear 67, the rotation of which will cause eccentric pin 83 to impart reciprocatory motion to the level wind lever 81 for pivotable movement about the pivot screw 45. Reciprocation of the forked end 80 of the level wind lever 81, as shown in FIG. 2, will drive the line distributor 75 back and forth across the line guide opening 70 with a "disappearance" at each end.

As will be appreciated, rotation of the crankshaft 112, in addition to driving the line distributor 75 across the line guide opening, will also cause the rotation of the spool 10 in a line retrieval direction through gear 50 and pinion 31. Accordingly, cast line will be retrieved and evenly wound upon the hub of the rotating spool by virtue of the progressive distribution of line across the spool by the reciprocating distributor 75. Advantageously and in contrast with most of the previously employed level wind devices, the level wind lever 75 does not encircle or otherwise trap the line L during pay out, and therefore it is totally non-interfering of the line during the casting operation. Moreover, at either end of the extent of its travel, the lever 75 is totally housed within the hollow line guide. This further contributes to the "non-interfering" or "non-entrapping" nature of the level wind mechanism of the present invention and also contributes to the uniform and even distribution of line adjacent the spool flanges 18, as will be understood. Indeed, the line is distributed alternately by opposite tapered surfaces 79' of the lever 75, as it travels first in one direction and then in the opposite direction across the face of the spool.

The drive mechanism of the present invention also includes an anti-reverse mechanism of the general type disclosed, for example, in my earlier U.S. Pat. Nos. 3,489,365 and 3,481,554. As shown in FIG. 1, a pivotable "no back" member 90 having teeth 91 thereon is adapted to lockingly engage the teeth of the level wind gear 67 and to prevent the rotation thereof. As will be understood, if the level wind gear 67 is blocked from rotating in one direction, the pinion 66 with which it is meshed also will be prevented from rotating in that direction, and, in turn, the crankshaft 112 will also be prevented from so rotating. Thus, the crankshaft 112 will be operable and rotatable only in one (line retrieval) direction, i.e., clockwise, as viewed in FIG. 1. More specifically, the no-back lever 90 is mounted to the plate 20 by a pivot member 92 for pivotal motion into and out of blocking motion engagement with the gear 67. An actuating member 95 is mounted in frictional contact with the gear 67 on its shaft 67' for rotation therewith in a desired direction (counterclockwise, as seen in FIG. 1). When gear 67 is rotated counterclockwise, the element 95 carrying a driving pin 96 will tend to be rotated also in a counterclockwise direction along therewith, and the pin 96 will cooperate with an elliptical opening 97 formed in the no-back lever 90 to drive the same away from the gear 67. As will be understood, as long as the gear 67 is rotating counterclockwise, the no-back element 90 will tend to be driven away from blocking engagement therewith. However, if the crankshaft 112 is turned in the opposite direction, the control element 95 will be rotated in a clockwise direction along therewith, causing the pin 96 to rotate the no-back element 90 into blocking engagement with the level wind gear 67.

The casting reel of the present invention advantageously may incorporate a conventional star drag brake arrangement, which is not illustrated in detail but which is readily controllable by a star wheel 100 threaded on the crankshaft 112 and cooperating with brake elements 101 and other elements in the hub 113 to vary the braking pressure applied between the star wheel 100 and the drive gear 50. The star brake mechanism, a clicker mechanism, if employed, the ball bearing support for the shaft 11, and other conventional casting reel structure form no part of this invention and are described herein for the sake of completeness. Of course, it will be readily appreciated that the inventive aspects of the present reel, which are directed specifically towards the new and improved level wind mechanism and the new and improved clutching and declutching mechanisms, as well as their interaction and cooperation, may be readily employed with or integrated into known designs and constructions of casting reels. Similarly, other known and desirable features of existing reels relating to drag brakes, adjustable bearing supports, clicker mechanisms, anti-reverse mechanisms, and the like, may readily be integrated into the design of the present fishing reel.

It will be appreciated that the structure of the new casting reel readily lends itself to mass production and assembly techniques, being comparatively uncomplicated and having a simple, efficient, and compact arrangement of parts. Moreover, the new level wind, clutch, and thumb button control arrangements contribute to the easy and reliable operation of the reel by a fisherman.

It should be understood that the specific casting fishing reel structure herein illustrated and described is intended to be representative only, as certain changes may be made therein without departing from the clear teachings of the disclosure. Accordingly, reference should be made to the following appended claims in determining the full scope of the invention.

I claim:

1. In a casting fishing reel including a line spool in spaced parallel relation, mounted on a spool shaft, end housings, pillar means supporting said end housing, bearings supported in said end housings and journaling the ends of said shaft, a drive mechanism selectively engageable with said shaft to rotate said spool in a predetermined line retrieval direction, a rotatable crankshaft for imparting torque to said drive mechanism, a reel with the improvement consisting of a level winding mechanism comprising
   a. line guide wall means extending between said two end housings and having a shallow U-shaped opening defined at the upper edge thereof;
   b. said U-shaped opening being of a width equal to the width of line supporting portions of said line spool;
   c. pivot means mounted on said line guide wall means below said shallow U-shaped opening;
   d. line distribution lever means pivotably mounted on said pivot means for swinging movement in a plane parallel to that of said line guide wall means and fully across and beyond said U-shaped opening, whereby said U-shaped opening is totally unobstructed by said lever at the opposite ends of its travel;
   e. reciprocating drive means operatively interconnected between said drive mechanism and said line distribution lever means to reciprocate said line distribution means across said U-shaped opening during operation of said drive mechanism.

2. The reel structure of claim 1, further including
   a. a second line guide wall means having a shallow U-shaped opening identical to that in the first mentioned line guide wall means,
   b. a pair of top wall means adjacent the upper ends of said U-shaped openings connecting said line guide wall means and generally defining therewith a hollow line guide housing for said line distribution lever;
   c. said line distribution lever being concealed at the opposite ends of its travel within said guide housing and beneath said top wall means.

3. The reel structure of claim 1, further characterized in that
   a. the upper free end of said line distribution lever means is tapered to a rounded point.

4. The reel structure of claim 1, further characterized in that
   a. said drive mechanism includes a gear train;
   b. said reciprocating drive means includes a foot portion of said line distribution lever extending toward said drive mechanism;
   c. a reciprocating level wind lever means is mounted for reciprocating pivotal movement in one of said end housings adjacent a rotatable gear in said gear train;
   d. an eccentric driving slot means formed in said level wind lever;
   e. a driving pin carried by said rotatable gear and cooperative with said eccentric slot means to reciprocatingly pivot said level wind lever in a plane generally parallel to that of said end housing;
   f. line distributor drive means formed integrally with said level wind lever means and being disposed in a plane generally perpendicular to that of said level wind lever means, which perpendicular plane is generally parallel to and adjacent the plane of said line distribution lever;
   g. connector means operatively linking said foot portion of said line distribution lever and said line distribution lever drive means;
   h. whereby reciprocating pivotal movement of said level wind lever in a plane parallel to said housing will be imparted to said line distribution lever as oscillatory movement across the width of the line spool.

5. The reel structure of claim 4, further characterized in that
   a. said connector means is comprised of a pin means carried by said foot portion of the line distribution lever and a slot means formed in the line distribution drive means and extending generally parallel to the axis of said line spool.

6. In a casting fishing reel including a line spool in spaced parallel relation, mounted on a spool shaft, end housings, pillar means supporting said end housing, bearings supported in said end housings and journaling the ends of said shaft, a drive mechanism selectively engageable with said shaft to rotate said spool in a predetermined line retrieval direction, a rotatable crankshaft for imparting torques to said drive mechanism, a reel with the improvement consisting of a level winding mechanism comprising
   a. a generally flat, hollow line guide extending between said two end housings;
   b. a U-shaped opening of less than the full width of said line guide and equal to the width of line supporting portions of said spool;
   c. a line distributor means supported for movement within said hollow line guide;
   d. reciprocator means in operative association with said line distributor means;
   e. said line distributor means having a needle-like line engaging portions adapted to reciprocate in predetermined back and forth strokes between the sides of said line guide and to traverse said opening during said strokes;
   f. whereby one side of said line distributor is adapted during a back stroke to engage line being wound on said spool and the other side of said line distributor is adapted to engage line during a forth stroke to distribute said line uniformly and evenly back and forth across said spool;
   g. said line distributor means being disposed completely within said housing and being non-contacting and removed from the path of said line at the opposite ends of its back and forth strokes.

7. The level wind mechanism of claim 1, further characterized, in that
   a. said line distributor means is in the form of a flat lever which is pivotably mounted to a wall of said hollow line guide housing;
   b. said lever has a tapered free end, the opposite sides of which alternately engage the line as said tapered end oscillates across said U-shaped opening.

* * * * *